June 24, 1958     T. B. VAN HORNE     2,840,308
ELECTRONIC CORRELATOR

Filed June 2, 1955     2 Sheets-Sheet 1

INVENTOR.
THOMAS VAN HORNE,
BY Henry Heyman
ATTORNEY.

June 24, 1958 T. B. VAN HORNE 2,840,308
ELECTRONIC CORRELATOR
Filed June 2, 1955 2 Sheets-Sheet 2

INVENTOR.
THOMAS VAN HORNE,
BY
Henry Hyman
ATTORNEY.

United States Patent Office 2,840,308
Patented June 24, 1958

2,840,308
ELECTRONIC CORRELATOR

Thomas B. Van Horne, Culver City, Calif., assignor to Hughes Aircraft Company, Culver City, Calif., a corporation of Delaware Application June 2, 1955, Serial No. 512,598

6 Claims. (Cl. 235—61)

This invention relates to a correlating system and more particularly to an apparatus and method for correlating a first low-frequency signal with either itself or a second low-frequency signal.

In the correlation of signals, a device for correlating a signal with itself is known as an auto-correlator, whereas a device for correlating one signal with another is known as a cross-correlator. The output signals generated by these devices are representations, respectively, of the auto-correlation function or the cross-correlation function of the functions as represented by the input signals. Basically, auto- or cross-correlation involves the taking of a time average of the product of a delayed signal with either the original signal or a second signal, as the case may be.

It has been found that the auto-correlation function of the random noise generated in the loop of a servomechanism system is extremely useful in determining optimum design criteria for stabilizing the servo loop. The random noise developed in the servo loop, however, generally constitutes a very low-frequency signal. Generating the auto-correlation function of this type of signal in the usual manner necessitates the use of apparatus capable of delaying or storing signals for substantial periods of time. Apparatus which is both expensive and cumbersome is required to effect this delay with the precision necessary to produce an accurate correlation function.

In accordance with one embodiment of the present invention, an auto-correlation function is developed by sampling the signal for short periods of time and at intervals equal to the desired increment of delay. For proper operation of the device it is necessary that it be capable of sampling at a rate such that several of these intervals occur during each half-cycle of the signal representative of the function being correlated. Basically, the system comprises a first, a second and an auxiliary storage circuit of which the first and second storage circuits are capable of being charged to a given voltage during the sampling period. The auxiliary storage circuit is coupled to the first storage circuit and is isolated therefrom by means of a delay circuit. The period of delay provided by this delay circuit need only be long enough to obtain a sample which, in accordance with the invention, may be considerably shorter than the increment of delay required to produce the auto-correlation function. In addition to the above, the auxiliary storage circuit must assume a potential equal to that of the first storage circuit within a period of time less than the interval between sampling periods and be capable of charging the second storage circuit to this potential.

Thus, in operation the first storage circuit is employed to sample an instantaneous value of the signal while the second storage circuit is simultaneously employed to sample the potential of the auxiliary storage circuit. From the above, it is apparent that the potentials at any instant of time on the first and second storage circuits represent successive samples of the signal being corre- lated, the delay time between these samples being determined by the intervals at which the signal was sampled and not by the delay circuit isolating the auxiliary storage circuit from the first.

Alternatively the above system may be connected in such a manner that the delay between the first and auxiliary storage circuits is provided, for example, by the difference of the closing time of different contacts of a relay rather than by a delay circuit. In either case, the auto-correlation function may be produced by taking a continuous time average of the samples taken by the first and second storage circuits. It is evident that the same principles described above to effect auto-correlation may be also used to effect cross-correlation by employing a third storage circuit to sample the second signal as will be hereinafter described.

It is therefore an object of the invention to provide a method of and apparatus for producing a signal representative of the correlation function of a low-frequency signal.

Another object of the invention is to provide a low-frequency correlating device incorporating means for periodically storing successive samples of the signal to be correlated separated by the time interval equivalent to the necessary time delay.

A further object of the invention is to provide a low-frequency electronic correlating device employing an unusually small number of inexpensive components.

The novel features which are believed to be characteristic of the invention, both as to its organization and method of operation, together with the further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
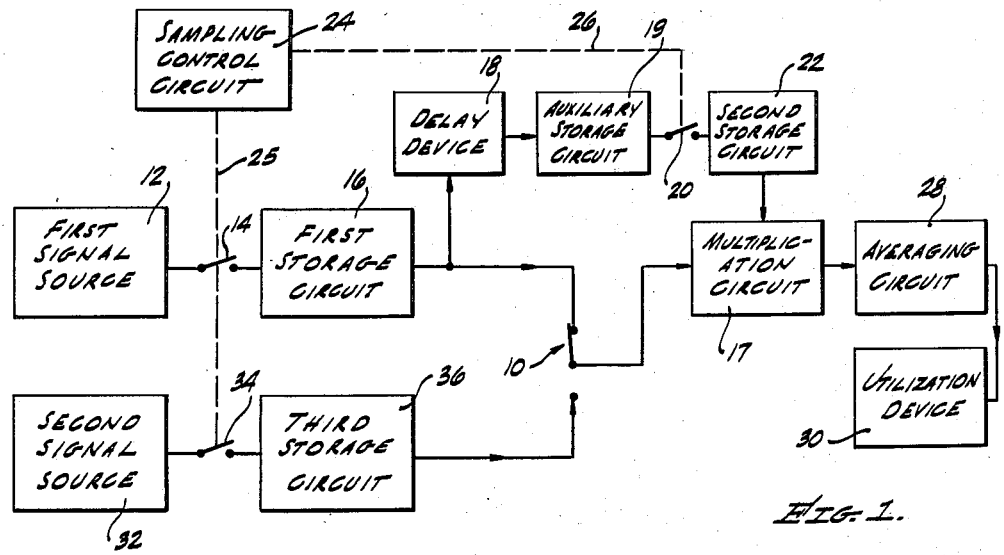
Figs. 1 and 2 are block diagrams including both auto- and cross-correlation embodiments of the present invention.

Referring to the drawings, in Fig. 1, the auto- and cross-correlation embodiments of the present invention are shown. The position of a switch 10 in Fig. 1 determines the mode of operation of the correlator, i. e., whether the operation is of the type which produces cross-correlation or whether it is of the type which produces auto-correlation. When the switch 10 is in the position shown in Fig. 1, the correlator operates as an auto-correlator. When the switch 10 is in the opposite position to the one shown, the correlator functions as a cross-correlator.

In accordance with the invention, a first signal source 12 is connected through a switch 14 to a first storage circuit 16. The first storage circuit 16 is, in turn, connected through the mode switch 10 to a multiplication circuit 17 and, in addition, through a delay device 18 to an auxiliary storage circuit 19. The auxiliary storage circuit 19 is then connected through a switch 20 to a second storage circuit 22. Both of the switches 14, 20 have "normally open" contacts which are caused to simultaneously and periodically close for an interval sufficient to allow the first and second storage circuits 16, 22 to assume the instantaneous potential of the signal provided by first signal source 12 and the potential stored by auxiliary storage circuit 19, respectively. During the interval when the switches 14, 20 are closed, it is necessary that the delay device 18 prevent any change in potential on the first storage circuit 16 from causing any substantial change in the potential on auxiliary storage circuit 19. In operation, the interval between successive closings of the switches 14, 20 is made equal to the time delay required for the generation of the correlation function. The periodic closing of the switches 14, 20 is effected by means of a sampling control circuit 24 which is mechanically coupled to the switches 14, 20 through linkages 25, 26, respectively.

It is evident that the potentials successively stored by the first and second storage circuits 16 and 22 are successive samples of the signal provided by first signal source 12 separated by an interval determined by the sampling control circuit 24. The auto-correlation function of the signal may thus be generated by taking the time average of the product represented by the potentials stored by the first and second storage circuits 16 and 22. This is accomplished by impressing the potentials stored by the first and second storage circuits 16, 22 on the multiplication circuit 17, the output of which is averaged by an averaging circuit 28 thereby making the auto-correlation function available for use by a utilization device 30.

In the event that it is desired to adapt the above device to produce the cross-correlation function of two signals, a second signal source 32, which provides the second signal, is connected through a switch 34 to a third storage circuit 36 which is, in turn, connected through the mode switch 10 to the multiplication circuit 17. The switch 34 has normally open contacts and is made to operate in synchronism with the switches 14, 20 by mechanically coupling it to the linkage 25, the operation of which is controlled by the sampling control circuit 24. The device may now be employed to generate the cross-correlation function of the signals provided by first and second signal sources 12, 32 by positioning the mode switch 10 so as to disconnect the first storage circuit 16 from multiplication circuit 17 and connect the third storage circuit 36 thereto instead.

Figure 2:
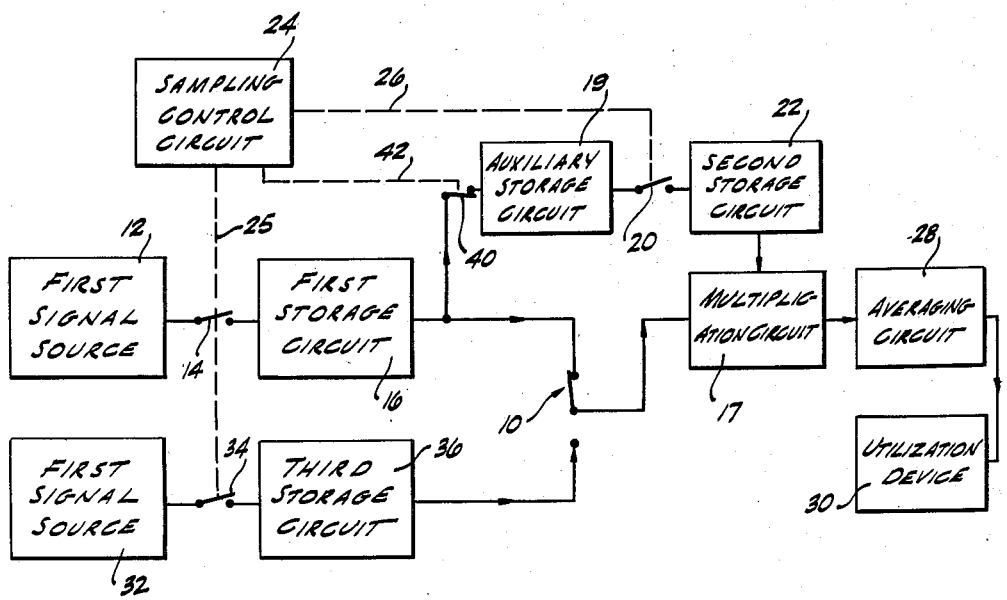
Figure 3:
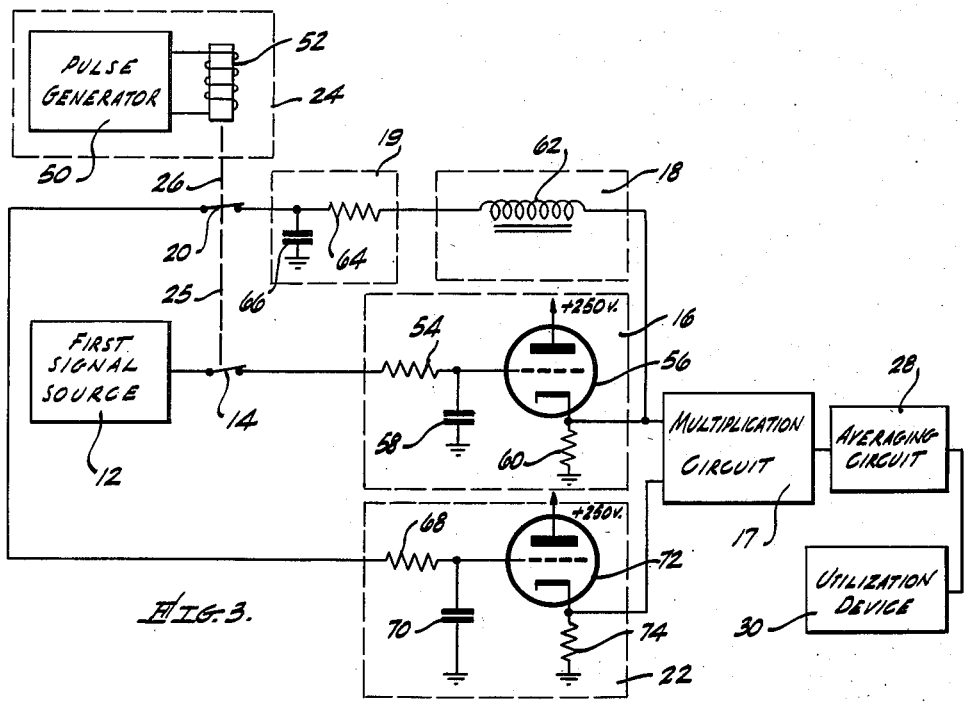
Fig. 3 is a schematic circuit diagram of the auto-correlation embodiment of the invention shown in Fig. 1.

The delay device 18 employed in producing the delayed sample in accordance with the invention, may constitute, for example, normally open and normally closed contacts of a relay or, alternatively, a passive delay element. As shown in Fig. 2, if the sampling control circuit 24 is a pulse operated relay, the normally closed contacts of a switch 40 which is mechanically coupled to the control circuit 24 by means of a linkage 42 may be employed to replace delay device 18. The control circuit 24 would then include a relay which would be of the type wherein the normally closed contacts of switch 40 completely open before the normally open contacts of other switches of the relay close. The normally open contacts of the relay would be employed for the switches 14, 20, and 34. The pull-in time delay of the relay is then adjusted to a minimal value consistent with the above limitations thereby completely isolating the auxiliary storage circuit 19 from the first storage circuit 16 prior to the time that the first and second storage circuits 16, 22 are connected by the normally open contacts of switches 14, 20 to the first signal source 12 and the auxiliary storage circuit 19, respectively. Referring to Fig. 3, there is shown a specific embodiment of the device of Fig. 1 wherein an inductor is used as the delay device 18 to isolate the auxiliary storage circuit 19 from the first storage circuit 16 during the sampling intervals thereby maintaining the potential on storage circuit 19 at its previous value so that the "previous" sample is "sampled" by the second storage circuit 22.

The device of Fig. 1 may be made to operate as an auto-correlator by connecting the output of the first storage circuit 16 to the multiplication circuit 17 or, alternatively, as a cross-correlator by connecting the output of the third storage circuit 36 thereto, instead. Since either the output of the first storage circuit 16 or the output of the third storage circuit is impressed on the multiplication circuit 17, it is seen that operation in the auto-correlation mode is substantially the same as operation in the cross-correlation mode. Thus, for explanation purposes, discussion will therefore be limited to the operation of the correlator of Fig. 1 as an auto-correlator.

A schematic diagram of a specific embodiment of the device of Fig. 1 which includes only the portions of the correlator necessary for performing auto-correlation which have proven entirely satisfactory is shown in Fig. 3. For the sake of clarity, signal source 12, multiplication circuit 17, averaging circuit 28, and utilization device 30 are still shown in block diagram form. Sampling control circuit 24 comprises a pulse generator 50 and a solenoid 52 which is adapted to operate the switches 14, 20 by means of the linkages 25, 26, respectively, in response to periodic output pulses produced by generator 50. The first storage circuit 16 comprises a resistor 54 connected in series to the control grid of a triode tube 56 together with a shunt capacitor 58 connected between the grid thereof and ground for storing a potential impressed thereacross. The tube 56 is connected to operate as a cathode follower by having its plate connected directly to a B+ supply and a resistor 60 connected between its cathode and ground. In this manner, a potential equal to that stored by capacitor 58 is made available without discharging the capacitor. This output from the cathode follower which provides a voltage equal to that on capacitor 58, is connected directly to the multiplication circuit 17 and, in addition, is connected through an inductor 62 to the auxiliary storage circuit 19. In this instance, the inductor 62 comprises the delay device 18.

Since a substantial period of time, as compared to the sampling interval, may be used to charge the auxiliary storage circuit 19, this circuit may comprise a series resistor 64 and a shunt capacitor 66 which has a comparatively large capacitance relative to that of capacitor 58. In the operation of the device, it is necessary that the voltage appearing across the capacitor 66 be substantially equal to the voltage on capacitor 54 prior to the commencement of the next succeeding sampling interval. During the sampling intervals, the voltage on capacitor 66 of auxiliary storage circuit 19 is impressed on the second storage circuit 22 by means of a connection thereto through the switch 20 from the common junction between capacitor 66 and resistor 64. The storage circuit 22 is similar to the storage circuit 16 in that it comprises a series resistor 68, a shunt capacitor 70 and a cathode follower including a triode tube 72 having a control grid connected to the common junction of resistor 68 and capacitor 70, and a cathode resistor 74. The output of the cathode follower, which provides a voltage substantially equal to that stored by the capacitor 70, is connected to the multiplication circuit 17.

It will be understood that the circuit specifications of the correlating device of the present invention may vary according to the design of any particular application. The following circuit specifications are included, by way of example only, as suitable for an auto-correlator for operating within a low-frequency range of from 0.2 to 10 cycles per second.

| | |
|---|---|
| Resistor 54 | 2,700 ohms |
| Resistor 60 | 2,700 ohms |
| Resistor 64 | 10,000 ohms |
| Resistor 68 | 2,200 ohms |
| Resistor 74 | 3,000 ohms |
| Capacitor 58 | 0.001 microfarad |
| Capacitor 66 | 0.05 microfarad |
| Capacitor 70 | 0.001 microfarad |
| Inductor 62 | 3 henries |
| Tube 56 | ½ type 12 AT7 |
| Tube 72 | ½ type 12 AT7 |

To explain the operation of correlators generally, it is necessary to refer to the approximate mathematical operation that they perform. This operation is $$R_{12}(\tau) = \lim_{T \to \infty} \frac{1}{T} \int_0^T y_1(t) y_2(t+\tau) dt \quad (1)$$

where $R_{12}(\tau)$ is the cross-correlation function, $\tau$ and $T$ are constants in the integration, $t$ is time, and $y_1(t)$ and $y_2(t)$ are two time-varying functions such as the signals to be correlated. When $y_1(t) = y_2(t) = y(t)$, that is, when a signal is to be correlated with itself, then $$R(\tau) = \lim_{T \to \infty} \frac{1}{T} \int_0^T y(t) y(t+\tau) dt \quad (2)$$

where $R(\tau)$ is the auto-correlation function. The time average of the product $y_1(t) y_2(t+\tau)$ or the product $y(t) y(t+\tau)$ is ordinarily obtained by means of a simple averaging circuit. Assuming that the output of the first and second signal sources 12, 32 provide a signal representative of $y_1(t)$ and $y_2(t)$, respectively, and the switch 10 is in the position opposite that shown, it is evident that the potential appearing on the storage circuits 16 and 36 and the auxiliary storage circuit 19 are step functions. In particular, the potentials appearing on auxiliary storage circuit 19 represent periodic instantaneous values of $y_1(t+\tau)$, each potential being stored for the period, $\tau$. This function, $y_1(t+\tau)$, which represents the function $y_1(t)$ delayed by a constant time, $\tau$ is necessary in the generation of a correlation function. However, at low frequencies, the delay time $\tau$ is sufficiently large as to make electronic delay lines impracticable due to the large physical length of the delay lines that must necessarily be employed.

The sampling process thus employed gives only an approximation to the correlation product. However, the length of the averaging time required to obtain the correlation function ordinarily insures that a sufficient number of samples is included so that sampling does not limit the accuracy of the device of the present invention. There is practically no lower limiting frequency and the upper limit is generally only determined by the minimum sampling interval which may be produced by the sampling control circuit 24 which may be a pulse generator operating a relay or an electronic gating circuit.

Figure 4:
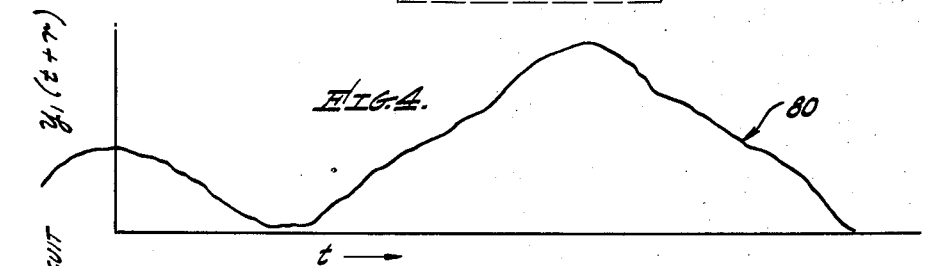
Figs. 4, 5, and 6 are graphs of time-varying voltages characteristic of the operation of the auto-correlation embodiment of the present invention.
Figure 5:
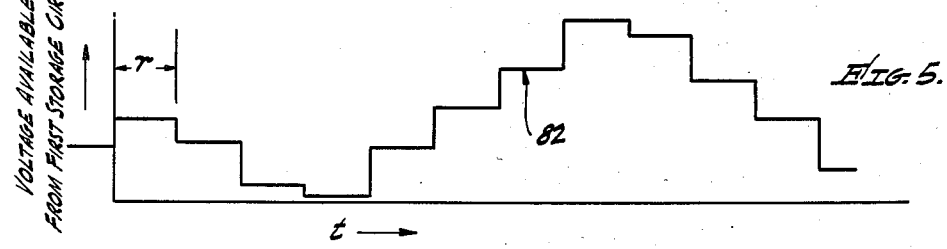
Figure 6:
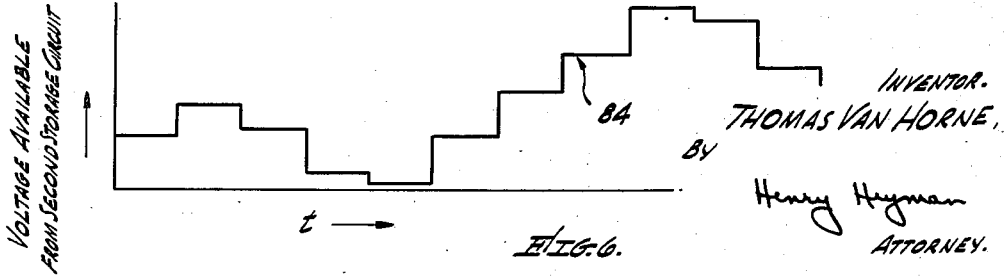

The operation of the correlating device of the present invention may be more clearly understood by means of wave forms shown in Figs. 4, 5, and 6. As previously noted, the auto-correlation function of a function $y_1(t)$ is:

$$\lim_{T \to \infty} \frac{1}{T} \int_0^T y_1(t) y_1(t+\tau) dt$$

wherein $\tau$ is a period of time and $T$ is total time. In the present device, if $\tau$ is treated as a positive quantity, it may be assumed that first signal source 12 provides a signal representative of $y_1(t+\tau)$. That is, $y_1(t)$ is essentially the function $y_1(t+\tau)$ delayed by the period of time, $\tau$. A typical function $y_1(t+\tau)$ is represented by the wave form 80 shown in Fig. 4.

During the operation of the device, the first storage circuit 16 periodically samples instantaneous values of the wave form 80 at intervals $\tau$ seconds apart by means of the sampling control circuit 24. Thus the potential appearing on the storage circuit 16 is a wave form 82 which may be considered as a series of stored samples representative of $y_1(t+\tau)$. During the sampling interval there is no substantial change in the potential stored by auxiliary storage circuit 19. In Fig. 2 this is accomplished by means of the interlocked relay switch 40 and in Fig. 3 by the inductor 62. Within a period of time equal to or less than $\tau$, however, it is necessary that auxiliary storage circuit 19 assume a potential substantially equal to that stored by the first storage circuit 19.

Simultaneously while the first storage circuit is sampling the instantaneous potential of wave form 80, the second storage circuit 22 is caused to sample the potential stored by the auxiliary storage circuit 19 which is substantially equal to the prior voltage stored by the first storage circuit 16. It is thus evident that potentials appearing on storage circuit 22 constitute the waveform 82 delayed by a period of time, $\tau$. These potentials are shown in Fig. 6 as waveform 84 which may be considered as a series of stored samples representative of $y_1(t)$. It is also apparent from the above, that the delay period $\tau$, may be controlled simply by varying the periodicity of the sampling interval. This is necessary in that it is generally desirable to generate the correlation function for several values of $\tau$.

The output voltages of the first and second storage circuits 16, 22 which have wave forms 82, 84 representative of the functions $y_1(t+\tau)$ and $y_1(t)$, respectively, are multiplied together and averaged by the multiplication circuit 17 and the averaging circuit 28 to generate the auto-correlation function of $y_1(t)$. In the event that it is desired to generate a cross-correlation function, the switch 10 is thrown to the position opposite to that shown in Figs. 1 and 2 and the signal provided by the second signal source 52 is assumed to be representative of $y_2(t+\tau)$. The operation is then the same as in the case of the auto-correlator described above.

What is claimed is:

1. In an electronic correlator having at least one signal source for providing a signal representative of a function to be correlated, the combination comprising first and second storage devices, an auxiliary storage device coupled to said first storage device, means for periodically and simultaneously connecting said first and second storage devices to said one signal source and said auxiliary storage device, respectively, for predetermined intervals of time, and means for isolating said auxiliary storage device from said first storage device during said predetermined intervals whereby the potentials appearing on said first and second storage devices are representative of said signal and said signal delayed for an interval of time between periodic connectings, respectively.

2. In an electronic correlator having at least one signal source for providing a signal representative of a function to be correlated, the combination as defined in claim 1 wherein said means for isolating said auxiliary storage device from said first storage device includes an inductor connected therebetween.

3. In an electronic correlator having at least one signal source for providing a signal representative of a function to be correlated, the combination as defined in claim 1 wherein said means for isolating said auxiliary storage device from said first storage device includes a switch having normally closed contacts connected therebetween, and means for opening said switch during said predetermined intervals of time.

4. In an electronic correlator having at least one signal source for providing a signal representative of a function to be correlated, the combination as defined in claim 1 wherein said first and second storage devices each comprise a space-discharge device including a control grid, and a cathode, a capacitor connected from said control grid to a first point of fixed potential, a resistor connected between an input terminal and said control grid, and a load resistor connected from said cathode to a second point of fixed potential whereby a voltage substantially equal to a potential on said capacitor is available at said cathode.

5. In an electronic correlator having a signal source for providing a signal representative of a function to be auto-correlated, the combination comprising first and second storage devices, an auxiliary storage device coupled to said first storage device, means for simultaneously and periodically connecting said first and second storage devices to said one signal source and said auxiliary storage device, respectively, for predetermined intervals of time, means for isolating said auxiliary storage device from said first storage device during said predetermined intervals, multiplication means connected to said first and second storage devices for producing a voltage representative of the product of the potentials successively stored by said first and second storage devices, and averaging means connected to said multiplication means for continuously averaging said voltage representative of said product thereby to produce a signal representative of the auto-correlation function of said function.

6. In an electronic correlator having first and second signal sources for providing first and second signals, respectively, representative of functions to be cross-correlated, the combination comprising first, second and third storage devices; an auxiliary storage device coupled to said first storage device; means for simultaneously and periodically connecting said first, second and third storage devices to said first signal source, said auxiliary storage device, and said second signal source, respectively, for predetermined intervals of time; means for isolating said auxiliary storage device from said first storage device during said predetermined intervals; multiplication means connected to said second and third storage devices for producing a voltage representative of the product of the potentials successively stored by said second and third storage devices; and averaging means connected to said multiplication means for continuously averaging said voltage representative of said product thereby to produce a signal representative of the cross-correlation function of said first and second functions.

References Cited in the file of this patent

UNITED STATES PATENTS 2,676,206     Bennett et al.            Apr. 20, 1954

OTHER REFERENCES

A Pulse-Operated Auto-Correlator (Stoneman) Royal Aircraft Establishment, technical note No. G. W. 225, pages 1, 3–8, 10–13, Figure 1a–5, December 1952.